United States Patent [19]

Nomura et al.

[11] 4,268,078
[45] May 19, 1981

[54] SHOCK ABSORBING BUMPER

[75] Inventors: Takao Nomura, Toyota; Yoshiro Umemoto, Nagoya; Yasuhiro Mishima; Tugumi Sanmiya, both of Toyota, all of Japan

[73] Assignee: Toyota Jidosha Kogyo Kabushiki Kaisha, Aichi, Japan

[21] Appl. No.: 43,707

[22] Filed: May 30, 1979

[30] Foreign Application Priority Data

May 30, 1978 [JP] Japan .............................. 53-72290[U]
Aug. 29, 1978 [JP] Japan ............................ 53-117333[U]

[51] Int. Cl.³ ............................................ B60R 19/00
[52] U.S. Cl. ...................................... 293/120; 52/717
[58] Field of Search .................. 293/120, 109, 108, 1; 114/219; 52/716, 717, 718

[56] References Cited

U.S. PATENT DOCUMENTS

| | | | |
|---|---|---|---|
| 2,319,678 | 5/1943 | Hall | 52/716 X |
| 2,531,967 | 11/1950 | Bishop | 52/716 X |
| 2,705,820 | 4/1955 | Torrence | 52/716 X |
| 3,703,747 | 11/1972 | Hamman | 52/717 X |
| 3,842,564 | 10/1974 | Brown | 52/716 |
| 3,866,963 | 2/1975 | Weller | 293/109 |
| 3,991,537 | 11/1976 | Brown | 52/717 |
| 4,066,285 | 1/1978 | Hall et al. | 52/716 X |

Primary Examiner—John P. Silverstrim
Assistant Examiner—Norman L. Stack, Jr.
Attorney, Agent, or Firm—Browdy & Neimark

[57] ABSTRACT

A shock absorbing bumper adapted for mounting on the front and rear ends of a vehicle such as an automobile, comprising an elastic external guard member having sheathed therein a shock absorbing flexible core member and a separately molded elastic decorative facing base provided on the front surface of the external guard member. The elastic facing base is integrally secured to a horizontal recession in the surface of the external guard member by inserting claws at both edges of the facing base into the corresponding holes formed along both upper and lower edges of the recession.

11 Claims, 14 Drawing Figures

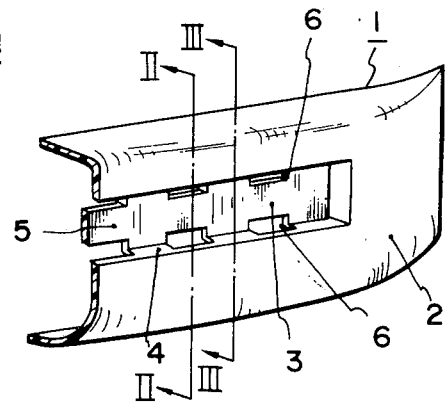
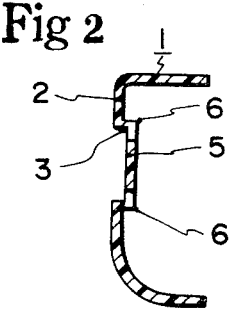
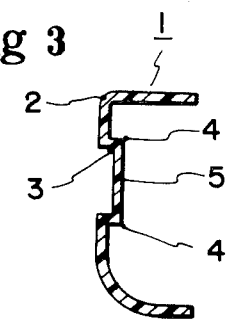
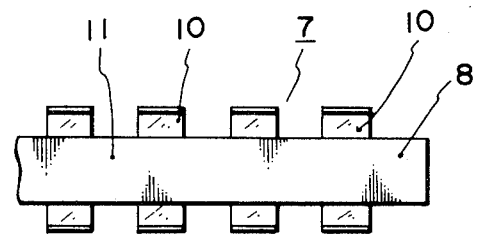
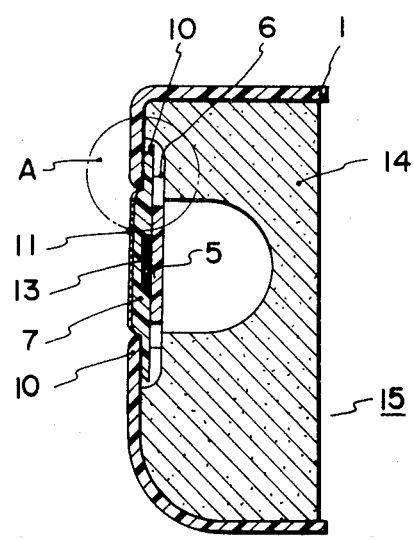
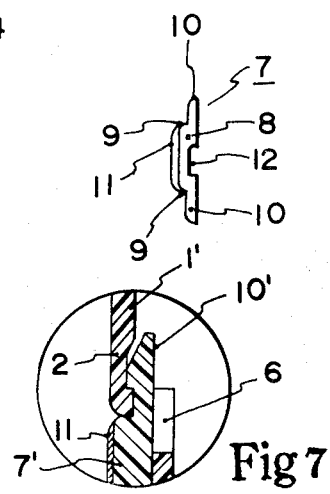

SHOCK ABSORBING BUMPER

FIELD OF THE INVENTION

The present invention relates to shock absorbing bumpers for mounting on the front and rear ends of a vehicle.

BACKGROUND OF THE INVENTION

As is well known, vehicles, such as automobiles, are mounted with a bumper on the front and rear thereof as a guard against collision, but most of the conventional bumpers are externally plated metallic ones, so that these bumpers, although looking nice in appearance, have the problem of shock absorption.

Recently, in answer to the diversified requirements and regulations such as elevated safety standards due to the increase of traffic volume and speed, fuel economization by weight-saving, reduction of cost, etc., elastic shock absorbing bumpers have been devised which are light in weight and easy to manufacture, comprising essentially an external guard member made of an elastic material such as an urethane elastomer and a flexible internal member such as an urethane foam core. These elastic bumpers, although excellent in shock absorption, have the problem in that they are generally poor-looking, and in order to cope with this problem, proposals have been made for integral adaptation of a decorative facing such as a plated metallic facing or aluminized hard resin facing to the shock absorbing bumper. However, because of very limited elastic capacity, such facings, in the event of collision, cannot follow the same process of elastic deformation and shock absorption as the bumper, and may suffer plastic deformation with the result that the decorative design of the facing be damaged by only one initial collision, necessitating replacement of the entire bumper in spite of its normal functioning for shock absorption. Thus, this type of bumper had the problems of troublesomeness and inconvenience in manufacture as well as in maintenance.

SUMMARY OF THE INVENTION

The first object of this invention is to solve these problems of the conventional elastic shock absorbing bumpers, and the second object of this invention is to realize easy integration of an elastic, shock-absorbing decorative facing assembly by simply inserting its claws into corresponding holes formed along the upper and lower edges of a recession provided on the front portion of the external bumper member. It is also envisaged according to this invention to provide means for allowing constant maintenance of the original aesthetic appearance of the facing even in the event of collision.

In order to accomplish these objects, there is provided according to this invention an improved shock absorbing bumper device comprising essentially an elastic external guard member having sheathed therein a flexible core member and a separately manufactured elastic facing base having provided on its front side an elastic decorative facing, the elastic facing base being integrally attached to the external guard member by inserting claws of the facing base into the corresponding holes provided in regularly or in staggered relationship along the upper and lower edges of a recession on the front side of the external member, whereby, in the event of collision, the striking energy is absorbed by the external member and the internal flexible core member while the facing suffers no plastic deformation owing to its elasticity but merely undergoes elastic deformation and can easily restore its original shape, thus maintaining its decorative design effect even after collision.

BRIEF DESCRIPTION OF THE DRAWINGS

In the drawings which illustrate the embodiments of this invention:

FIG. 1 is a partial perspective view of an external bumper member according to one embodiment of this invention;

FIG. 2 is a sectional view taken along the line II—II of FIG. 1;

FIG. 3 is a sectional view taken along the line III—III of FIG. 1;

FIG. 4 is a partial front view of an elastic facing base;

FIG. 5 is a side view thereof;

FIG. 6 is a sectional view of a shock absorbing bumper according to this invention;

FIG. 7 is an enlarged sectional view showing another embodiment of a fixing arrangement at the encircled portion A of FIG. 6;

DESCRIPTION OF THE PREFERRED EMBODIMENTS

Figure 8:
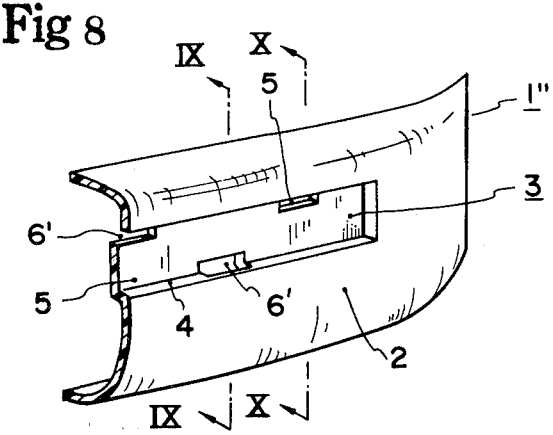
FIG. 8 is a partial perspective view of an external bumper member according to another embodiment of this invention.
Figure 9:
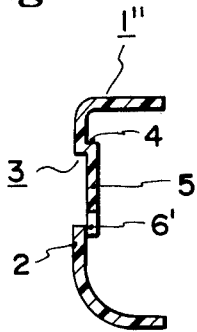
FIG. 9 is a sectional view taken along the line IX—IX of FIG. 8.
Figure 10:
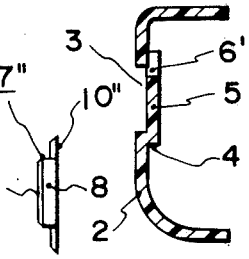
FIG. 10 is a sectional view taken along the line X—X of FIG. 8.

Referring to FIGS. 1 to 7 which show a first embodiment of this invention, numeral 1 denotes an elastic external guard member of the type used as an automobile bumper made of an urethane elastoner. The external member is U-shaped in cross-section and has formed in its front portion 2 a horizontal recession 3 with a predetermined width, depth and length. In the recession 3 are formed a plurality of holes 6, 6 of a predetermined size, the holes being arranged at fixed intervals and in opposed relationship along the upper and lower edges 4, 4 and somewhat extending into the bottom portion 5 of the recession 3.

The external member 1 of the construction shown in FIGS. 1 to 3 can be molded at one time with a suitable molding die.

The elastic facing base 7 is made of an urethane elastomer and has an I-shaped section as shown in FIGS. 4 and 5 is separately molded and provided with a plurality of claws 10, 10 along the upper and lower edges of the horizontal strip-shaped facing section 8 the claws 10, 10 being so designed as to correspond in both size and position to the insertion holes 6, 6 in the recession 3 of the external member 1. On the front side of the facing section 8 is provided an elastic decorative facing 11 formed of a vacuum-deposited aluminum foil.

Thus, the elastic facing 11 can make elastic deformation integrally with the elastic facing base 7.

For accomplishing assemblage of the elastic facing base 7 and the elastic external member 1 which were molded separately from each other, first the claws 10, 10 along one edge of the facing base 7 are inserted into the corresponding holes 6, 6 in the recession 3 of the external member 1 frontwise thereof and then the remaining claws 10, 10, that is, those along the other edge of the facing base 7 are inserted into the associated holes 6, 6 by curving the claws making use of their elasticity. Upon insertion, both members are securely attached to each other owing to spring-back.

Where necessary, as shown in FIG. 5, a lateral notch 12 may be provided in the back side of the elastic facing base 7 and a suitable adhesive 13 may be applied to the notch to thereby bond the back side of the facing base to the bottom 5 of the recession 3 while effecting the above-described engagement of the claws 10, 10 in the corresponding holes 6, 6.

The elastic decorative facing 11 may be an elastic thin film such as an aluminized Tedlar film, and if desired, dry spattering may be employed.

For further intensifying the spring back anchorage of the elastic facing base 7 in the holes 6, 6 in the recession 3 of the external member 1, the engagement of each claw 10 on the backside of the front portion of the external member 1 in the encircled portion A in FIG. 6 may be effected as shown in FIG. 7, that is, a protuberant portion and an undercut are provided at the end of each claw 10 of the facing base 7' while a corresponding under-cut and protuberance are provided on the backside of the front portion 2 of the external member 1' so that the claw 10' dovetails in the corresponding part of the external member 1'. Other various modifications are also possible within the scope of this invention.

Finally, a separately molded U-sectioned flexible urethane foam core member 14 is fitted in the external member 1 as shown in FIG. 6 to thereby complete a shock absorbing bumper 15.

In case an automobile adapted with the just described shock absorbing bumper 15 should collide against an object, the resultantly produced striking energy is absorbed by the elastic external member 1 and internal flexible core member 14 and both members under elastic deformation can soon restore to their original shapes. The elastic facing base 7 is also deformed together with the elastic decorative facing 11 provided thereon, but as it is integrally fixed to the external bumper member by secure engagement of the claws 10, 10 in the corresponding holes 6, 6, it follows the same pattern of elastic deformation and restoration as the bumper member and won't fall off because of the secure integral engagement.

Needless to say, the decorative facing 11 also undergoes the same process of deformation and restoration as it is elastically secured to the external bumper member 1 through said elastic facing base 7, and hence such facing 11 won't suffer plastic deformation and its decorative form remains unchanged.

Particularly, such shock absorption and retention of the decorative design effect of the facing can be perfectly ensured at collision in low-speed running at, say, less than 8 kg/hr.

In another embodiment of this invention shown in FIGS. 8 to 14, the elastic external member 1" is one-shot molded from an urethane elastomer as in the preceding embodiment and also U-shaped in section. In a recession 3 formed horizontally in the front portion 2 of the external member are provided a plurality of holes 6', 6' of a predetermined size, the holes being arranged along the upper and lower edges 4, 4 of the recession 3 but in a staggered relationship to each other somewhat extending into the bottom portion 5 of the recession 3.

Figure 11:
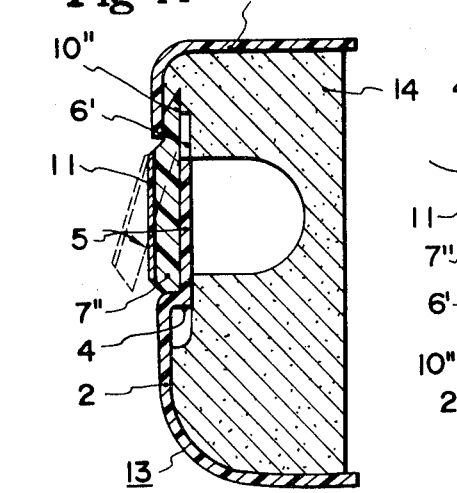
FIG. 11 is a partial front view of an elastic facing base in another embodiment of this invention.
Figure 12:
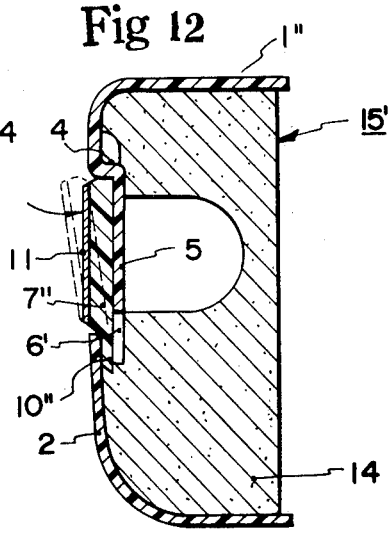
FIG. 12 is a side view thereof.

The elastic facing base 7", as shown in FIGS. 11 and 12, is made of an urethane elastomer and molded from a suitable molding die, and the elongated strip-shaped facing section 8 is of a size that matches the recession 3 as in the preceding embodiment. Along both upper and lower edges 9, 9 thereof are provided a plurality of claws 10", 10" which are arranged corresponding in both size and position to the staggeredly arranged insertion holes 6', 6'. Each of the claws 10" is tapered at its end. Also, an elastic decorative facing 11 prepared in the same way as in the preceding embodiment is formed on the front side of the elastic facing base 7".

For incorporation of the elastic facing base 7" to the elastic external bumper member 1" which were molded separately from each other, the claws 10", 10" of the facing base 7" are inserted alternately into the corresponding positioned insertion holes 6', 6' by availing of the elasticity of the facing base 7".

Figure 13:
FIG. 13 is a sectional view of a shock absorbing bumper of this invention.
Figure 14:
FIG. 14 is a similar sectional view to FIG. 13.

Such inserting operation can be accomplished relatively easily as the claws 10", 10" are arranged in staggered relation at the upper and lower edges of the facing base, and since the lateral strain of the facing section 8 can be turned to good use for inserting every next claw 10" by curving it, such insertion can be effected with ease successively as shown in FIGS. 13 and 14.

When the last claw 10" is inserted into the corresponding hole 6', all of the inserted claws 10", 10" maintain the original flat condition owing to spring-back, and thus the facing base 7" is securely held in position and won't be removed easily.

The above-described incorporation may be performed by applying a suitable adhesive to the facing section 8 of the elastic facing base 7" or to the bottom surface 5 of the recession 3 as in the preceding embodiment.

Upon completion of the attachment of the elastic facing base 7" to the elastic external bumper member 1", a flexible urethane foam soft member 14 is adapted inside the external member 1" to thereby complete a shock absorbing bumper 15" as shown in FIGS. 13 and 14.

In the event of collision of an automobile mounted with the just described shock absorbing bumber 15' the striking energy is absorbed by the elastic external member 1", and flexible internal member 14 and both these members can restore to their shapes owing to their elastic properties, while the elastic facing base 7" also undergoes the similar pattern of elastic deformation and restoration together with the elastic decorative facing 11 provided thereon as the facing base 7" is integrally secured to the external member 1" through engagement of the claws 10", 10" in the corresponding insertion holes 6', 6', so that such decorative facing fitment won't fall off but will maintain its aesthetic design even after collision.

The mode of practice of this invention is not limited to the above-described embodiments. For instance, the elastic facing base may be adapted to a top surface portion, both sides or other suitable locations on the elastic external bumper member. Also, letters, marks, etc., indicating the vehicle type or such may be inscribed at any pertinent spot in the top, corner, etc., of the external member.

Thus, according to this invention, a recession is provided in the front portion of an elastic external guard member which has sheathed therein a flexible core member, and an elastic facing base fixed in the recession by elastically inserting its claws into the corresponding insertion holes formed along both upper and lower edges of the recession, so that in the event of collision, the striking energy is absorbed by both the external and internal flexible members while the elastic facing base won't slip off but undergoes the same pattern of elastic deformation as the external member and can easily restore to its shape owing to its own elasticity. Such pattern of integral deformation and restoration is also followed by the elastic decorative facing provided on the front side of the facing base, and hence such decorative facing can always maintain its decorative design.

Since the elastic facing base and the external bumper member are molded separately from each other in the production process, their manufacturing processes don't interfere with each other and can therefore be performed at high efficiency. Their assembling together is also easy as the elastic facing base is simply attached and secured to a recession provided on the front portion of the external bumper member. Further, in the case of the I-shaped facing base, its claws can be easily engaged in the corresponding holes in the external bumper member, allowing enhanced working efficiency and high precision. Their engaged relation is such that there takes place no relative displacement between the elastic facing base and the external bumper member during running of the vehicle.

In case the claws of the elastic facing base are provided in staggered relation along the upper and lower edges of the base and inserted into the corresponding insertion holes which are also arranged in staggered relation along the upper and lower edges of the horizontal recession in the front surface of the external bumper member, these claws, when once inserted into position in the corresponding holes, are brought into a fastly anchored condition owing to spring-back, thus securing the facing base against separation or removal from the external bumper member not only during running of the vehicle but also in the event of collision. Also, since the upper and lower claws can be inserted alternately into the corresponding insertion holes at the time of assemblage, the elastic bending deformation of one claw relative to the associated insertion hole can be easily effected by making use of elasticity of the claw and the body portion of the facing base, so that the assembling work is further facilated to provide even more increased working efficiency and precision.

What is claimed is:

1. A shock absorbing bumper comprising an elastic external guard member having sheathed therein a flexible core member and an elastic decorative facing provided on the front side of the external member, the improvement which comprises said external member having in its front surface side walls and a bottom wall forming a lateral recession provided with a plurality of generally rectangularly shaped insertion holes arranged along the upper and lower edges where the side walls join the bottom wall, and said decorative facing is provided on a relatively thin elastic facing base provided with a plurality of correspondingly rectangularly shaped claws arranged along the upper and lower edges thereof so that said claws are matingly engaged into said corresponding insertion holes to thereby secure said facing base integrally to said external bumper member thereby resisting vibrational disengagement of said facing base from said external bumper member.

2. A shock absorbing bumper according to claim 1, wherein said recession is provided horizontally in the outer portion of said external bumper member.

3. A shock absorbing bumper according to claim 1, wherein a set of symbolizing letters or marks, is inscribed at an upper corner of said external bumper member.

4. A shock absorbing bumper according to claim 1, wherein said recession is formed to possess a substantial depth.

5. A shock absorbing bumper according to claim 1, wherein said elastic decorative facing constitutes a vacuum-deposited aluminum foil.

6. A shock absorbing bumper according to claim 1, wherein said elastic decorative facing is formed by dry spattering.

7. A shock absorbing bumper according to claim 1, wherein said elastic decorative facing is formed from a thin elastic film.

8. A shock absorbing bumper according to claim 7, wherein the thin elastic film constitutes a Tedlar film.

9. A shock absorbing bumper according to claim 1, wherein said rectangularly shaped insertion holes are arranged in staggered relationship along the upper and lower edges of said recession and the claws of said facing base are also arranged in a staggered configuration to matingly engage with said insertion holes.

10. A shock absorbing bumper according to claim 1, wherein corresponding protuberant portions and undercuts are provided at the engaging portions of each of said insertion holes and said claws so that each of the claws dovetails with the corresponding part of its matingly engaged insertion hole.

11. A shock absorbing bumper according to claim 10 wherein an adhesive is applied between the bottom of said recession and the back side of the elastic facing base.

* * * * *